United States Patent
Bogdan et al.

(10) Patent No.: US 6,490,456 B1
(45) Date of Patent: Dec. 3, 2002

(54) LOCATING A MOBILE UNIT IN A WIRELESS TIME DIVISION MULTIPLE ACCESS SYSTEM

(75) Inventors: Brian J. Bogdan, Succasunna, NJ (US); Michael J. Golden, Bloomsbury, NJ (US); Alex Matusevich, Morris Plains, NJ (US); Jonathan M. Tobias, Florham Park, NJ (US); Chris C. Tsamutalis, Long Valley, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/416,624

(22) Filed: Oct. 12, 1999

(51) Int. Cl.⁷ .................................................. H04Q 7/20
(52) U.S. Cl. ...................... 455/456; 455/436; 342/450; 342/463
(58) Field of Search ................................ 455/456, 436, 455/442; 342/450, 451, 463

(56) References Cited

U.S. PATENT DOCUMENTS 5,613,205 A    3/1997   Dufour
6,011,974 A  * 1/2000   Cedervall et al. ............ 455/456
6,061,565 A  * 5/2000   Innes et al. .................. 455/456
6,122,512 A  * 9/2000   Bodin .......................... 455/440

FOREIGN PATENT DOCUMENTS

EP        0 800 319 A1    10/1997
WO        WO 99/15911      4/1999

* cited by examiner

*Primary Examiner*—Lee Nguyen
(74) *Attorney, Agent, or Firm*—Steve Mendelsohn; Yuri Gruzdkov

(57) ABSTRACT

A method for locating a mobile unit without synchronizing base-stations is provided. A triangulation scheme where distances between a plurality of base-stations and a mobile unit (herein termed mobile) are calculated by measuring at least three round-trip-delay-values wherein each round-trip-delay-value corresponds to transmission of a downlink signal from each base-station to the mobile unit and transmission of an uplink signal, in response to the downlink signal, from the mobile unit to each base-station is described. It is a low-cost solution without requiring the participating base-stations to be accurately synchronized in time and with the added advantages of utilizing a known downlink signal and a known uplink signal in determining the position of the mobile.

16 Claims, 3 Drawing Sheets

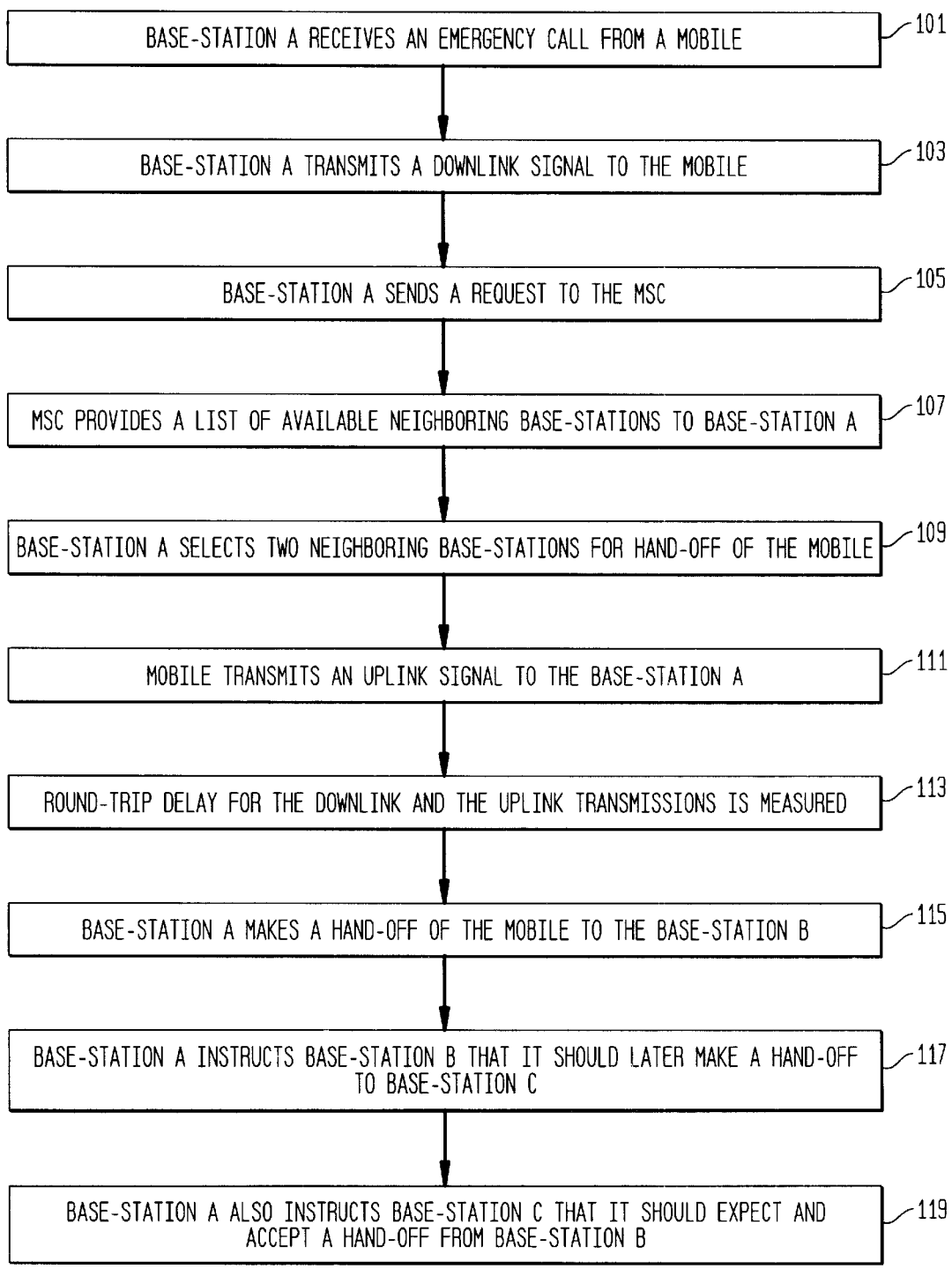

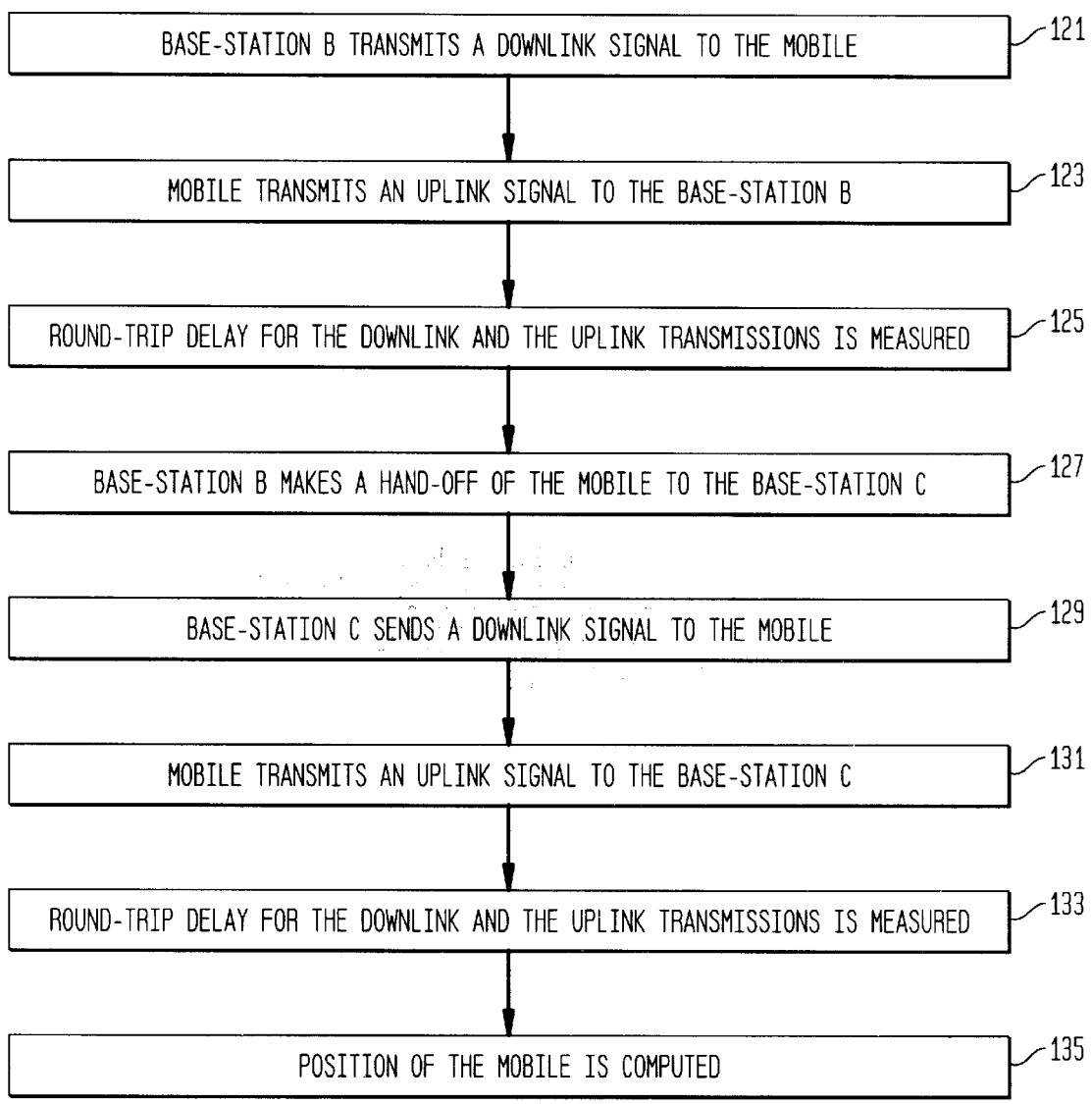

TRANSMISSION OFFSET = 45 SYMBOLS + TIME ALIGNMENT

LOCATING A MOBILE UNIT IN A WIRELESS TIME DIVISION MULTIPLE ACCESS SYSTEM

BACKGROUND OF THE INVENTION

1. Field of the Invention

The present invention generally relates to wireless communications and particularly to locating mobile units in a wireless time division multiple access (TDMA) communication system.

2. Description of the Related Art

The proliferation of mobile units or cell phones and their technology and usage, has suggested various applications for the ability to locate mobile units. These applications include "911" calls, tourist and travel information, tracking unauthorized cell phone usage and illegal activities, and locating commercial and government vehicles. The basic cell phone systems can determine the nearest base-station which locates a cell phone only to within 3 to 10 miles. However, FCC Regulations, as dictated in FCC Docket 94-102, require location accuracy of about 400 feet for mobile units (cellular/PCS users) for E-911 (Emergency-911) service by October 1, 2001.

Therefore, a great deal of emphasis has been placed on developing systems that can track the position of mobile units more accurately. One known method for locating mobile units is time difference of arrival (TDOA) which has been used for many years, at least in such applications as the Global Positioning System (GPS). Applying TDOA to cell phones involves measuring the time of arrival of a signal transmitted from a cell phone at a multiplicity of base-stations and comparing the arrival times to determine how long the signal took to reach each base-station. The TDOA algorithm, however, requires that at least three base-stations must be accurately synchronized in time before a mobile unit can be located accurately. This is an expensive and difficult requirement.

SUMMARY OF THE INVENTION

A method for computing the position of a mobile unit without synchronizing base-stations is provided. The principles of the present invention use a triangulation scheme where distances between a plurality of base-stations and a mobile unit (herein termed mobile) are calculated by measuring the round-trip delay time (i.e., round-trip delay value) of known symbols in the transmitted signals.

In an illustrative embodiment, upon receiving a 911 emergency call from a mobile, a serving (i.e., primary) base-station transmits a known downlink signal comprising 162 symbols to the mobile. Out of 162 symbols, 14 symbols are sync words and 148 symbols are control and data symbols. The serving base-station also contacts the Master Switching Center (MSC) and requests a list of neighboring base-stations available for hand-off. In response to the inquiry from the serving base-station, the MSC provides a list of neighboring base-stations available for hand-off. Then, the serving base-station selects at least two neighboring base-stations from the list to perform hand-off of the mobile.

In the meantime, the mobile receives the downlink signal transmitted by the serving base-station. The mobile then identifies its unique 14 symbol sync words and then transmits an uplink signal comprising 45 symbols to the serving base-station. This uplink signal is received by the serving base-station, which measures the total round-trip delay value for the downlink and uplink transmissions.

After the total round-trip delay value has been measured, the serving base-station performs a hand-off of the mobile to a first neighboring base-station. The first neighboring base-station receives the hand-off and immediately transmits an analogous downlink signal to the mobile. The mobile receives the downlink signal and in response transmits an analogous uplink signal to the first neighboring base-station. The total round-trip delay value for this second pair of downlink and uplink transmissions is then measured. After measuring the round-trip delay value, the first neighboring base-station performs a hand-off of the mobile to a second neighboring base-station. The second neighboring base-station also transmits an analogous downlink signal to the mobile and in response receives an analogous uplink signal from the mobile. The round-trip delay value for this third pair of downlink and uplink transmissions is then measured. After computing all three round-trip delay values, a triangulation algorithm is used to compute the position of the mobile.

Thus, the principles of the present invention provide a scheme to determine the position of the mobile within the desired range of accuracy without requiring the participating base-stations to be accurately synchronized in time. Thus, the principles of the present invention provide a low-cost solution with the added advantages of utilizing a known downlink signal and a known uplink signal in determining the position of the mobile.

In one embodiment, the present invention is a method for locating a mobile unit in a wireless network having a plurality of base-stations, comprising the steps of (a) receiving at least three round-trip-delay-values, each round-trip-delay-value corresponding to transmission of a downlink signal from one of at least three base-stations to the mobile unit and transmission of an uplink signal, in response to the downlink signal, from the mobile unit to the one base-station; and (b) determining the position of the mobile unit based on the at least three round-trip-delay-values using a triangulation algorithm.

In another embodiment, the present invention is a node of wireless network having a plurality of base-stations, the node configured to locate a mobile unit in the wireless network by (a) receiving at least three round-trip-delay-values, each round-trip-delay-value corresponding to transmission of a downlink signal from one of at least three base-stations to the mobile unit and transmission of an uplink signal, in response to the downlink signal, from the mobile unit to the one base-station; and (b) determining the position of the mobile unit based on the at least three round-trip-delay-values using a triangulation algorithm.

BRIEF DESCRIPTION OF THE DRAWINGS

FIGS. 1A and 1B illustrate different steps involved in one embodiment of the present invention;

DETAILED DESCRIPTION

Figure 2:
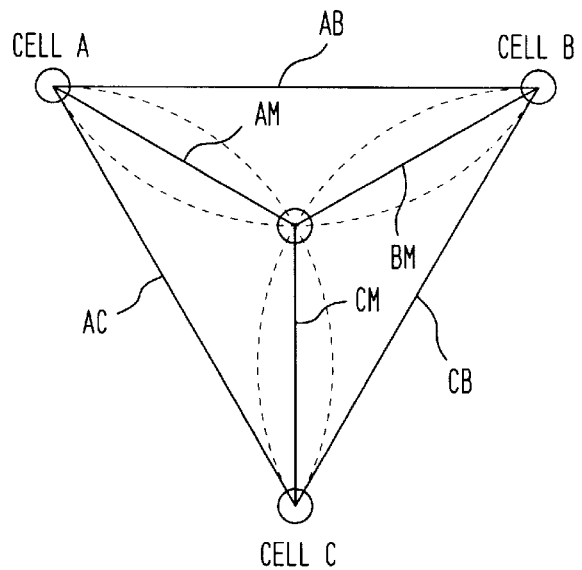
FIG. 2 illustrates a triangulation scheme in accordance with the principles of the present invention.

FIGS. 1A and 1B illustrate different steps involved in one embodiment of the present invention. In this embodiment, the position of a mobile is determined for geolocation purposes (e.g., in cases of emergency).

As illustrated in FIGS. 1A and 1B, first, a serving base-station, termed base-station A, receives a 911 (emergency) call from a mobile (block 101). Next, base-station A transmits a downlink signal to the mobile (block 103). Base-station A also contacts the Mobile Switching Center (MSC) and requests a list of neighboring base-stations available for hand-off (block 105). The term hand-off is well-known in the art and usually defines a process where one base-station transfers the control of a mobile to another base-station. In TDMA systems, hand-off includes transferring the control of a mobile to a new base-station as well as changing the operating frequency of the mobile to match the operating frequency of the new base-station.

The MSC receives the request and in return provides a list of neighboring base-stations available for hand-off (block 107). Base-station A then selects at least two neighboring base-stations from this list for hand-off of the mobile (block 109).

In the meantime, the mobile receives the downlink signal transmitted from base-station A, and in response transmits an uplink signal back to base-station A (block 111). Base-station A receives the uplink signal transmitted from the mobile and measures the round-trip delay time (i.e., a first round-trip delay value) for the downlink transmission and the uplink transmission between base-station A and the mobile (block 113). Then, base-station A makes a hand-off of the mobile to a first neighboring base-station, termed base-station B (block 115). The hand-off usually includes changing the operating frequency of the mobile to match the operating frequency of base-station B.

Base-station A also instructs base-station B that after transmitting a downlink signal to the mobile and receiving an uplink signal from the mobile, the mobile should be handed-off to a second neighboring base-station termed base-station C (block 117). Base-station A also instructs base-station C that base-station C should expect to receive a hand-off from base-station B (block 119). Base-station B accepts the hand-off and then transmits a downlink signal to the mobile (block 121). The symbols and sync words of this signal transmission are similar to the downlink signal from base-station A. The mobile receives the downlink signal and in response transmits an uplink signal to base-station B (block 123). Base-station B receives the uplink signal transmitted from the mobile and measures the total round-trip delay time (i.e., a second round-trip delay value) for these downlink and uplink transmissions (block 125).

Next, base-station B performs a hand-off of the mobile to base-station C (block 127). Once again, the operating frequency of the mobile is changed to match the operating frequency of base-station C. Base-station C accepts the hand-off and then transmits a downlink signal to the mobile (block 129). The mobile receives the downlink signal and, in response, transmits an uplink signal to base-station C (block 131). Base-station C receives the uplink signal transmitted from the mobile and measures the round-trip delay time (i.e., a third round-trip delay value) for these downlink and uplink transmissions (block 133).

Next, a triangulation algorithm is used to compute the position of the mobile based on all three round-trip delay values (block 135). Generally, the position of the mobile may be computed at the MSC. After computing the three round-trip delay values, distances between the mobile and each of the base-stations may be computed. Then, as illustrated in FIG. 2, the geometric principles of triangulation may be used to compute the position of the mobile. In FIG. 2, the three base-stations are illustrated as A, B, and C and the mobile is illustrated as M. The distances between the mobile and each of the base-stations are illustrated as AM, BM, and CM, respectively. The distances between the base-stations are termed AB, AC, and CB.

In a land-based wireless system, distances AB, AC, and CB are known and do not change. The speed of the signal transmission in a wireless system is also known and remains constant. So, after measuring all three round-trip delay values, an approximation of the distances AM, BM, and CM can be computed by dividing the corresponding round-trip delay value by 2 to compute a one-way delay value, and then multiplying the one-way delay values by the known speed of the wireless signal. After AM, BM, and CM have been computed, the position of the mobile is determined by triangulation.

The scheme described in FIGS. 1A, 1B, and 2 computes the position of the mobile without requiring the participating base-stations to be accurately synchronized in time. Thus, the principles of the present invention provide a low-cost solution with the added advantages of utilizing known downlink and uplink signals in the position determination.

The principles of the present invention are flexible and actual processing of the position determination may occur at one or more focal points in the wireless system. In a typical TDMA wireless system, the MSC processes the round-trip delay values to compute the position. However, this processing may occur at one or more base-stations or within the mobile itself. In the latter case, the mobile is supplied with all three round-trip delay values and the fixed distances between the base-stations so that the mobile may compute its own position.

In a typical wireless system, base-stations have RF switches and couplers that would allow a particular base-station to receive its own transmitted signal and measure the round-trip delay value. But, a particular base-station may be configured to process signals transmitted from other base-stations as well, and compute the position of the mobile.

The scheme described in FIGS. 1A, 1B, and 2 determines the position of a mobile with some degree of accuracy. However, to achieve the desired location accuracy of about 400 feet for E-911 purposes, further adjustments to this scheme are warranted. The total round-trip-delay value $T_{RTD}$ includes more than just the actual time taken for a wireless signal to propagate back and forth between the base-station and the mobile. For example, in an illustrative embodiment, $T_{RTD}$ for base-station A is:

$$T_{RTD}(A) = C_{GDT} + T_{AM} + M_{GDR} + T_o + M_{PD} + M_{GDT} + T_{MA} + C_{GDR}$$

wherein: $T_{RTD}(A)$=Total round-trip delay for downlink and uplink transmissions between base-station A and mobile M $C_{GDT}$=Cell group delay on transmit path (i.e., the downlink path)

$T_{AM}$=Actual time taken to propagate signal from base-station A to mobile $M_{GDR}$=Mobile group delay on receive path (i.e., the uplink path)

$T_o$=Transmission offset delay $M_{PD}$=Mobile processing delay $M_{GDT}$=Mobile group delay on transmit path $T_{MA}$=Actual time taken to propagate signal from mobile to base-station A $C_{GDR}$=Cell group delay on receive path $C_{GDT}$ and $C_{GDR}$ are group delays associated with the transmit and receive paths respectively for the base-station. These group delays correspond to the delays associated with the equipment used in transmitting and receiving signals. The equipment includes filters, antennas, cables, transmitters, and receivers. Although these delays vary from one base-station to another, and from one cell to another, these delays are easy to compute. Once these delays have been computed, they remain constant. These delays are usually measured in nanoseconds and are computed by transmitting a known test signal and measuring the associated group delays. $C_{GDT}$ and $C_{GDR}$ values for a particular base-station are generally known at the base-station as well as at the MSC.

Figure 3:
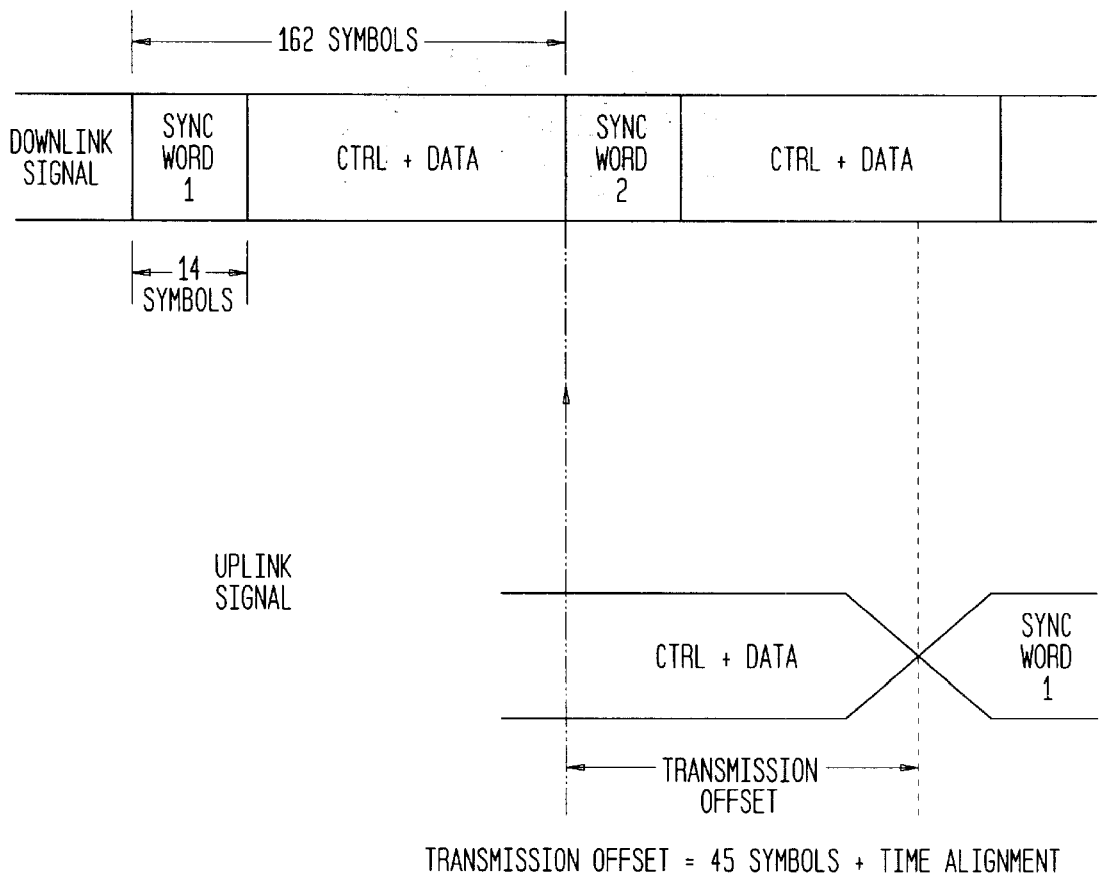
FIG. 3 illustrates an exemplary downlink signal and uplink signal utilized in the implementation of the present invention.

Similarly, $M_{GDT}$ and $M_{GDR}$ are mobile group delays associated with the equipment used within the mobile. These delays are usually measured by the manufacturer by sending a test signal to a test mobile. Generally, a test signal is transmitted to a test mobile with a known location and the associated group delays are then computed. These delay values are generally stored in the mobile's non-volatile memory by the manufacturer. The MSC and other base-stations have the capability to query the mobile to obtain the values of the mobile group delays The transmission offset $T_o$ is incurred by the mobile because there is a delay from the time the mobile receives a downlink signal to the time when the mobile transmits an uplink signal. In one embodiment, as illustrated in FIG. 3, the downlink signal received by the mobile comprises 162 symbols in total, out of which 14 symbols form a single sync word. Upon receiving a downlink signal, the mobile utilizes the sync words to identify its assigned timeslot in the transmission stream. Only then, the mobile transmits its uplink signal. Thus, there exists a transmission offset. As illustrated in FIG. 3, this transmission offset is made of 45 symbols and a known time-alignment value. This transmission offset may vary from one mobile to another, but is a known value for a particular mobile and does not change.

The processing delay $M_{PD}$ is associated with the actual processing of signals within the mobile. $M_{PD}$ may also be measured by the manufacturer and stored in the mobile's non-volatile memory. There are many ways by which this $M_{PD}$ delay may be computed. In an illustrative embodiment, the MSC may send a test message to a test mobile with a known location and receive a response and then compute the mobile's processing delay $M_{PD}$ by measuring the round-trip delay time. $M_{PD}$ may be stored in the mobile's memory and may be made available to all base-stations and the MSC.

Thus, assuming that $T_{RM}$ is equal to $T_{MA}$, the actual time ($T_{AM}$) that it takes for a wireless signal to propagate from base-station A to the mobile is:

$$T_{AM} = [T_{RTD(A)} - (C_{GDT} + M_{GDR} + T_o + M_{PD} + M_{GDT} + C_{GDR})]/2$$

wherein the round-trip delay value $T_{RTD}$ is measured in accordance with the principles of the present invention, but the remaining parameters on the right hand side of the equation are known for the mobile and the particular base-station and remain constant. Once $T_{AM}$ has been computed, the corresponding distance AM can be computed by multiplying $T_{AM}$ by the known speed at which wireless signals travel. By utilizing $T_{AM}$ instead of $T_{RTD}/2$, the distance AM is computed more accurately.

Once AM has been computed, similar procedures may be followed to compute BM and CM. After AM, BM, and CM are known, the triangulation algorithm may be utilized to find the position of the mobile M.

The principles of the present invention compute the position of the mobile to within the desired accuracy of about 400 feet without requiring the expense of synchronizing base-stations. The principles of the present invention utilize known downlink and uplink signals and may be implemented without incurring substantial additional cost or additional external circuitry.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for locating a mobile unit in a wireless network having a plurality of base-stations, comprising the steps of:
   (a) receiving at least three round-trip-delay-values, each round-trip-delay-value corresponding to transmission of a downlink signal from one of at least three base-stations to the mobile unit and transmission of an uplink signal, in response to the downlink signal, from the mobile unit to the one base-station;
   (b) adjusting each round-trip-delay-value for one or more delays not corresponding to signal propagation time; and
   (c) determining the position of the mobile unit based on the at least three round-trip-delay-values using a triangulation algorithm, wherein:
   the one or more delays comprise a cell group delay on the downlink path, a mobile group delay on the downlink path, a mobile group delay on the uplink path, and a cell group delay on the uplink path.

2. The method of claim 1, wherein the wireless network is a TDMA network.

3. The method of claim 1, wherein step (c) is performed at one of the base-stations.

4. The method of claim 1, wherein step (c) is performed at the mobile unit.

5. The method of claim 1, wherein:
   the first base-station receives, from a master switching center (MSC) of the wireless network, a list of at least two neighboring base-stations available for hand-off and the first base-station selects the second and third base-stations from the list;
   the first base-station initiates the hand-off to the second base-station and instructs the second base-station to hand-off the mobile unit to the third base-station; and
   the second base-station initiates the hand-off to the third base-station.

6. The method of claim 1, wherein the one or more delays further comprise:
   a transmission offset delay corresponding to a specified number of symbols plus a specified alignment value; and
   a mobile processing delay.

7. The method of claim 6, wherein:
   the wireless network is a TDMA network;
   step (a) further comprises the steps of:
   (1) transmitting a first downlink signal from a first base-station to the mobile unit;
   (2) receiving a first uplink signal transmitted by the mobile unit to the first base-station in response to the first downlink signal;
   (3) computing a first round-trip-delay value corresponding to the transmission of the first downlink signal and the first uplink signal;
   (4) transmitting a second downlink signal from a second base-station to the mobile unit;

(5) receiving a second uplink signal transmitted by the mobile unit to the second base-station in response to the second downlink signal;

(6) computing a second round-trip-delay value corresponding to the transmission of the second downlink signal and the second uplink signal;

(7) transmitting a third downlink signal from a third base-station to the mobile unit;

(8) receiving a third uplink signal transmitted by the mobile unit to the third base-station in response to the third downlink signal; and (9) computing a third round-trip-delay value corresponding to the transmission of the third downlink signal and the third uplink signal, wherein:

control of the mobile unit is transferred from the first base-station to the second base-station prior to step (4);

control of the mobile unit is transferred from the second base-station to the third base-station prior to step (7);

the first base-station receives, from a master switching center (MSC) of the wireless network, a list of at least two neighboring base-stations available for hand-off and the first base-station selects the second and third base-stations from the list; and when control is transferred from the first base-station to the second base-station, the first base-station instructs the second base-station to transfer control of the mobile unit to the third base-station after step (6).

8. The method of claim 1, wherein step (c) is performed at a master switching center (MSC) of the wireless network.

9. A node of wireless network having a plurality of base-stations, the node configured to locate a mobile unit in the wireless network by:

(a) receiving at least three round-trip-delay-values, each round-trip-delay-value corresponding to transmission of a downlink signal from one of at least three base-stations to the mobile unit and transmission of an uplink signal, in response to the downlink signal, from the mobile unit to the one base-station;

(b) adjusting each round-trip-delay-value for one or more delays not corresponding to signal propagation time; and (c) determining the position of the mobile unit based on the at least three round-trip-delay-values using a triangulation algorithm, wherein:

the one or more delays comprise a cell group delay on the downlink path, a mobile group delay on the downlink path, a mobile group delay on the uplink path, and a cell group delay on the uplink path.

10. The node of claim 9, wherein the one or more delays further comprise:

a transmission offset delay corresponding to a specified number of symbols plus a specified alignment value; and a mobile processing delay.

11. The node of claim 10 further configured to locate a mobile unit in the wireless network by:

(1) transmitting a first downlink signal from a first base-station to the mobile unit;

(2) receiving a first uplink signal transmitted by the mobile unit to the first base-station in response to the first downlink signal;

(3) computing a first round-trip-delay value corresponding to the transmission of the first downlink signal and the first uplink signal;

(4) handing off the mobile unit from the first base-station to a second base-station;

(5) transmitting a second downlink signal from the second base-station to the mobile unit;

(6) receiving a second uplink signal transmitted by the mobile unit to the second base-station in response to the second downlink signal;

(7) computing a second round-trip-delay value corresponding to the transmission of the second downlink signal and the second uplink signal;

(8) handing off the mobile unit from the second base-station to a third base-station;

(9) transmitting a third downlink signal from the third base-station to the mobile unit;

(10) receiving a third uplink signal transmitted by the mobile unit to the third base-station in response to the third downlink signal; and

(11) computing a third round-trip-delay value corresponding to the transmission of the third downlink signal and the third uplink signal.

12. The node of claim 9, wherein the wireless network is a TDMA network.

13. The node of claim 9, wherein the node is a master switching center (MSC) of the wireless network.

14. The node of claim 9, wherein the node is one of the base-stations.

15. The node of claim 9, wherein the node is the mobile unit.

16. The node of claim 9, wherein:

the first base-station receives, from a master switching center (MSC) of the wireless network, a list of at least two neighboring base-stations available for hand-off and the first base-station selects the second and third base-stations from the list;

the first base-station initiates the hand-off to the second base-station and instructs the second base-station to hand-off the mobile unit to the third base-station; and the second base-station initiates the hand-off to the third base-station.

* * * * *